(12) United States Patent
Shaw

(10) Patent No.: US 7,059,345 B2
(45) Date of Patent: Jun. 13, 2006

(54) PUMP BYPASS SYSTEM

(75) Inventor: Christopher K. Shaw, Damascus (SY)

(73) Assignee: Baker Hughes Incorporated, Houston, TX (US)

( * ) Notice: Subject to any disclaimer, the term of this patent is extended or adjusted under 35 U.S.C. 154(b) by 155 days.

(21) Appl. No.: 10/308,580

(22) Filed: Dec. 3, 2002

(65) Prior Publication Data
US 2004/0103944 A1   Jun. 3, 2004

(51) Int. Cl.
*F04B 17/00* (2006.01)
(52) U.S. Cl. .............................. 137/565.35; 417/423.15
(58) Field of Classification Search .......... 137/565.29, 137/565.3, 565.33, 565.35; 417/423.14, 417/423.15, 423.3
See application file for complete search history.

(56) References Cited

U.S. PATENT DOCUMENTS

| | | | | |
|---|---|---|---|---|
| 1,904,320 A | * | 4/1933 | Marples | 137/565.35 |
| 2,092,376 A | * | 9/1937 | Klemm | 137/565.35 |
| 2,095,243 A | * | 10/1937 | Diescher | 137/565.33 |
| 2,612,843 A | * | 10/1952 | Gruetjen | 417/423.14 |
| 2,857,850 A | * | 10/1958 | Tsiguloff | 417/423.14 |
| 3,096,785 A | * | 7/1963 | Hornschuch | 137/565.35 |
| 3,682,186 A | | 8/1972 | Howe | |
| 3,983,895 A | | 10/1976 | Pouska et al. | |
| 4,081,930 A | | 4/1978 | Jones | |
| 4,548,263 A | | 10/1985 | Woods | |
| 4,799,552 A | | 1/1989 | Acree | |
| 5,181,839 A | * | 1/1993 | Tuckey | 417/423.3 |
| 5,203,682 A | | 4/1993 | Inklebarger | |
| 5,769,955 A | | 6/1998 | Kozisek | |
| 6,216,788 B1 | | 4/2001 | Wilson | |
| 6,336,238 B1 | | 1/2002 | Tarlton | |
| 6,412,562 B1 | | 7/2002 | Shaw | |

FOREIGN PATENT DOCUMENTS

| | | |
|---|---|---|
| GB | 2254656 A | 10/1992 |
| GB | 2288197 A | 10/1995 |
| WO | WO94/00668 | 1/1994 |
| WO | WO02/075111 A1 | 9/2002 |

* cited by examiner

*Primary Examiner*—John Rivell
(74) *Attorney, Agent, or Firm*—Bracewell & Giuliani LLP

(57) ABSTRACT

A system for injecting water into a well boosts pressure in a flowline leading to the injection well. A bypass flowline is connected into and forms part of the main flowline. A bypass valve is located in the bypass flowline for opening and closing the bypass flowline. A housing has an inlet connected to the bypass flowline upstream of the bypass valve in an outlet connected to the bypass flowline downstream in the bypass valve. Inlet and outlet valves selectively open and close the inlet and outlet of the housing. A centrifugal pump assembly is mounted in the housing, the pump having an intake in communication with the inlet of the housing. The pump has a discharge tube that communicates with the inlet of the housing. An isolation member separates discharge pressure of the discharge tube from the intake pressure at the intake. A removable end cap on an end of the housing enables the pump assembly to be inserted and withdrawn from the housing.

16 Claims, 1 Drawing Sheet

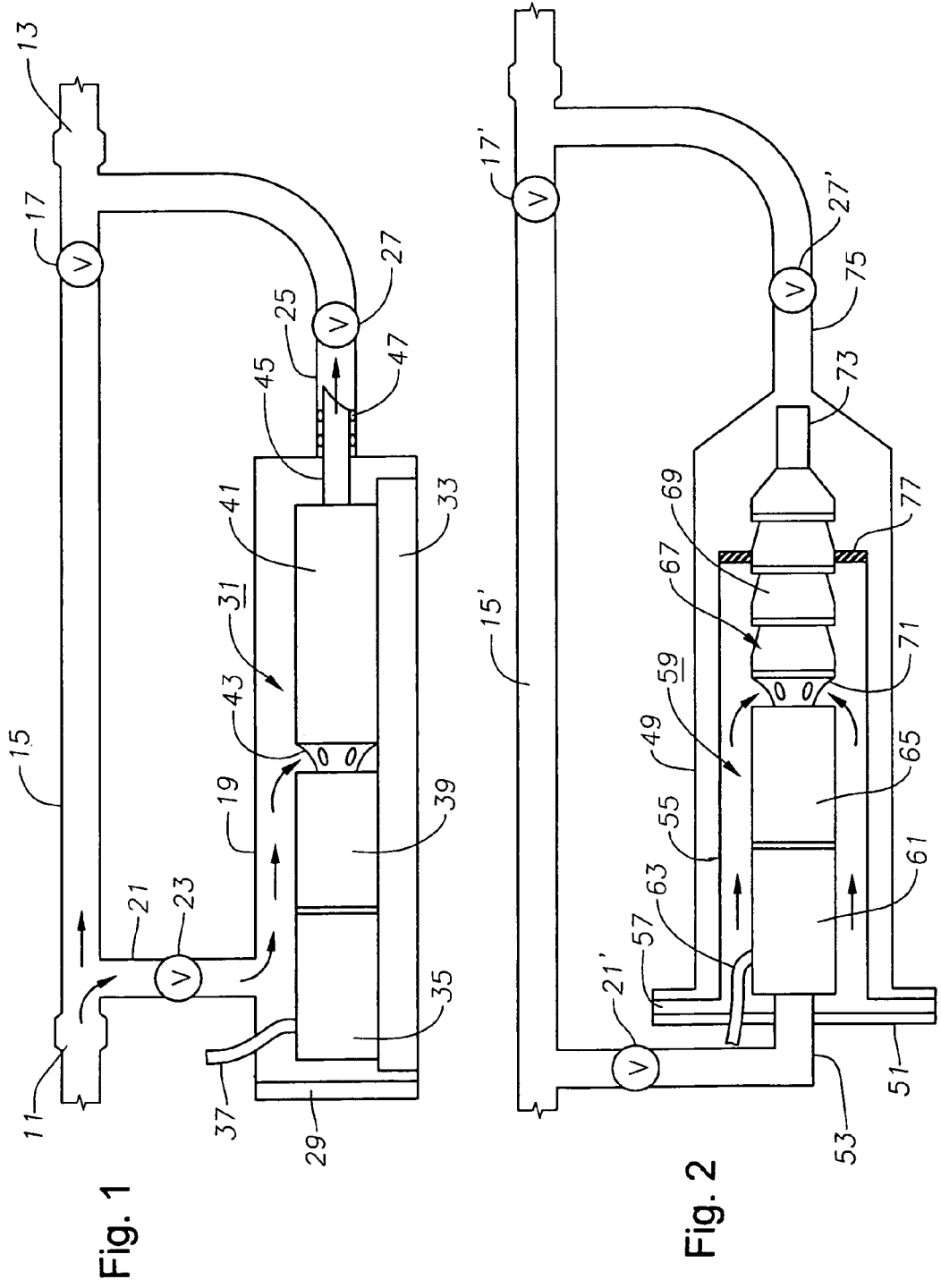

PUMP BYPASS SYSTEM

FIELD OF THE INVENTION

This invention relates in general to flowline pumps, and in particular to a pump for injecting fluid into a well, the pump being mounted to a bypass line that enables the flow to continue through the injection flowline while the pump is shut down.

BACKGROUND OF THE INVENTION

Injection wells are commonly used in oilfields to inject fluid back into an oil reservoir to force oil from producing wells. Typically, water that has been separated from the produced oil is pumped by surface pumps into the injection wells. The surface pumps may be of a variety of types.

One type of pump utilized downhole as a producing pump and at times on the surface as an injection pump is an electrical centrifugal pump. The pump assembly includes a pump made of a large number of impellers and diffusers. The pump is driven by an electrical motor. 1 It has been known to install an electrical pump assembly of this nature directly in line with an injection or main flowline from the water source to the injection well. The pump boosts the pressure of the fluid flowing through the injection line. On disadvantage is when the pump needs to be repaired or replaced, the flow through the main flowline to the injection well must be shut down while the pump is uncoupled from the main flowline and replaced or repaired.

SUMMARY OF THE INVENTION

In this invention, a bypass flowline is connected into and forms part of a main flowline, such as an injection flowline. A bypass valve is located in the bypass flowline for selectively blocking flow through the bypass flowline. A housing is mounted adjacent the main flowline. An inlet conduit connects an interior of the housing to the bypass flowline upstream of the bypass valve. A pump assembly has an intake in the housing in fluid communication with the inlet conduit and a discharge tube in fluid communication with the bypass flowline downstream of the bypass valve.

When the bypass valve is closed and the pump is operating, the pump assembly boosts pressure of the fluid flowing through the injection flowline. The pump assembly can be removed by opening the bypass valve and closing valves in the inlet conduit and the outlet from the pump assembly. The closed valves obviate the need for depressurization of the flowline. Flow can continue through the injection flowline while the pump assembly is being removed.

BRIEF DESCRIPTION OF THE DRAWINGS

FIG. 1 is a schematic representation of an electrical submersible pump connected into an injection flowline in a manner in accordance with this invention.

FIG. 2 is an alternate embodiment of a pump assembly connected into an injection flowline in accordance with this invention.

DETAILED DESCRIPTION OF THE PREFERRED EMBODIMENT

Referring to FIG. 1, an injection or main flowline has a first portion 11 and a second portion 13 that are connected together by a bypass line 15. Bypass line 15 may be considered to be a part of the injection flowline, and has a bypass valve 17 within it. When bypass valve 17 is open, fluid is free to flow from first flowline portion 11 to second flowline portion 13.

A housing 19 is mounted adjacent bypass line 15. Housing 19 is preferably a long cylindrical member connected to first flowline portion 11 by an inlet conduit 21. Inlet conduit 21 extends into a sidewall of housing 19 at its upstream end. An inlet valve 23 is located in inlet conduit 21 for selectively opening and closing it. When inlet valve 23 is open, fluid flowing through the first flowline portion 11 flows into the interior of housing 19. Inlet conduit 21 is shown extending into the sidewall of housing 19, although it could also be mounted coaxially.

Housing 19 also has an outlet conduit 25, which in this instance is located on a downstream end of housing 19, opposite the upstream end. Outlet conduit 25 is shown to be coaxial with housing 19. Outlet conduit 25 leads to bypass line 15 downstream of bypass valve 17 and thus leads to second flowline portion 13. Second flowline portion 13 could be mounted coaxial with outlet conduit 25, rather than shown coaxial with first flowline portion 11. When inlet valve 23 and outlet valve 27 are open, fluid from first flowline portion 11 is free to flow through housing 19 and into second flowline portion 13.

An end cap 29 is releasably mounted to one end of housing 19, preferably the upstream end. End cap 29 is secured by conventional fasteners, such as a plurality of bolts. End cap 29 is perpendicular to the longitudinal axis of housing 19 in this embodiment.

A submersible pump assembly 31 is located within the housing 19. Pump assembly 31 is shown being supported by a support 33 located on the lower side of housing 19. A variety of other devices could be employed to mount pump assembly 31 within housing 19. Preferably, pump assembly 31 is secured to support 33 to transmit thrust to support 33 and housing 19. Pump assembly 31 is of a type that is conventionally installed downhole within wells for pumping well fluids to the surface.

Pump assembly 31 includes a submersible electrical motor 35, preferably a three-phase AC motor. Motor 35 is supplied with power through a power cable 37 that extends sealingly through the sidewall of housing 19. Motor 35 is coupled to a seal section 39 that seals around the shaft of the motor and seals lubricant contained within motor 35. Seal section 39 also reduces any pressure differential between the exterior of motor 35 and the pressure of the lubricant within motor 35. Seal section 39 is connected to a centrifugal pump 41. In the first embodiment, centrifugal pump 41 is made up of a plurality of stages of impellers and diffusers located within a cylindrical pump housing. Pump 41 has an intake 43 located at its upstream end.

Pump 41 has a discharge tube 45 that is in fluid communication with bypass line 15 downstream of valve 17. Preferably, discharge tube 45 stabs into outlet conduit 25, which has a polished bore for sealingly receiving it. Seals 47 seal between the outer diameter of discharge tube 45 and the interior of outlet conduit 25. Seals 47 thus serve as an isolation means to isolate the discharge pressure of pump 41 from the pressure of the fluid at intake 43.

In the operation of the first embodiment, pump assembly 31 is installed by opening end cap 29 and sliding it into housing 19. Discharge tube 45 will stab sealingly into outlet conduit 25. Power cable 37 is connected to a prior source and to motor 35, and end cap 29 is secured in place.

While pump assembly 31 is being installed in housing 19, valve 17 is preferably open and valves 23, 27 closed. Fluid flows uninterrupted from first flowline portion 11 to second flowline portion 13 and to an injection well. Once pump assembly 31 is installed in housing 19, valves 23, 27 are opened and bypass valve 17 is closed. Fluid from first flowline portion 11 flows through inlet conduit 21 into housing 19. The fluid flows around motor 35 and into intake 43. Pump 41 increases the pressure and discharges the fluid out discharge tube 45 into outlet conduit 25. The fluid flows into the second flowline portion 13 and into the injection well.

If pump assembly 31 needs to be repaired or replaced, the above steps are reversed. Valves 23 and 27 are closed and bypass valve 17 opened, taking housing 19 out of the flow path of the injection line 11, 13 to enable pump assembly 31 to be removed from housing 19 and repaired or replaced.

In the second embodiment, a bypass line 15' and a bypass valve 17' are employed in the same manner as the first embodiment. Housing 49 of the second embodiment is also an elongated cylindrical member. In this embodiment, however, end cap 51 has an inlet conduit 53 leading coaxially into it. Also, a cylindrical shroud 55 is mounted coaxially within housing 49. Shroud 55 is a pressure containing member that has a flange 57 on its upstream end for bolting between end cap 51 and flanges of housing 49. The downstream end of shroud 55 is open while end cap 51 forms the upstream end of shroud 55.

Pump assembly 59 is mounted partially in shroud 55, coaxial with the longitudinal axis of shroud 55 and the longitudinal axis of housing 49. Pump assembly 59 is mounted on a support (not shown) that supports pump assembly 59 in the coaxial position as well as transmitting thrust to shroud 55 and end cap 51.

Pump assembly 59 includes an electrical motor 61 that has a power cable 63 that leads sealingly through end cap 51. A conventional seal section 65 is connected to motor 61. A pump 67 is mounted to seal section 65 and driven by the shaft of motor 61. Pump 67 is also a centrifugal pump, but in this embodiment, it is a type referred to as a bolted-bowl pump. In a bolted-bowl pump, diffusers 69 of each stage are bolted together, rather than stacked together within a cylindrical pump housing as in pump 41 of the first embodiment. Diffusers 69 are typically of larger diameter than the diffusers of the stages of pump 41. However, as they are not contained within a pump housing, they are normally not able to withstand as much pressure differential between the pressure on the exterior and interior of diffusers 69. There is a single intake 71 at the upstream end of pump 67 and a discharge tube 73 on the downstream end. Discharge tube 73 is preferably located downstream of the downstream end of shroud 55, although it could be recessed within shroud 55.

Discharge tube 73 does not stab sealingly into outlet conduit 75 of housing 49. Rather, it discharges into the interior of housing 49 and is located upstream from outlet conduit 75. A packoff 77 extends between the interior of shroud 55 and one of the diffusers 69 to serve along with shroud 55 as an isolation means for isolating pump discharge pressure from pump intake pressure. Packoff 77 may be selectively sealed around any one of the diffusers 69.

The particular position of packoff 77 is selected so as to provide a minimum pressure differential between the interior and the exteriors of the various diffusers 69. The interior of shroud 55 is thus exposed to intake pressure while the exterior of shroud 55 is exposed to discharge pressure. The internal pressure within pump 67 increases with each stage. Consequently, the internal pressure within the third diffuser 69 is greater than the internal pressure within the first upstream diffuser 69. For example, if each stage of the four stages schematically shown increases the pressure by about 100 psi, the discharge pressure would be about 400 psi greater than the intake pressure. Placing packoff 77 at a halfway point would result in the pressure differential between the interior and the exterior of each stage 67 to no more than about 200 psi. In practice, each diffuser 69 has a maximum allowable pressure difference, thus packoff 77 could be moved upstream or downstream from the midpoint and still be within allowable ranges.

In the operation of the embodiment of FIG. 2, pump assembly 59 is installed by closing valves 21' and 27' and opening bypass valve 17'. The operator removes end cap 51 and pulls out shroud 55. After pump assembly 59 is repaired or replaced, it is inserted into shroud 55 and packoff 77 is installed at a selected point. Shroud 55 and pump assembly 59 are then moved back into housing 49. End cap 51 fastens flange 57 of shroud 55 as well as sealing the upstream end of housing 49.

Once in place, the operator opens valves 21' and 27' and closes bypass valve 17'. Fluid flows into inlet conduit 53 around motor 61 and into intake 71. Pump 67 discharges the fluid from discharge tube 73 into the interior of housing 49. The fluid flows out of outlet conduit 75 into the injection flowline.

The invention has significant advantages. The pump assembly can be used to boost pressure in a flowline when desired. The bypass line and the valves allow the pump to be taken offline without having to stop the flow through the main flowline. The second embodiment allows the pressure differential across a bolted-bowl pump to be optimized.

While the invention has been shown in only two of its forms, it should be apparent to those skilled in the art that it is not so limited but is susceptible to various changes without departing from the scope of the invention. Although shown as a booster pump for an injection line for well production, the pump assembly and bypass line could be utilized for boosting pressure in other types of flowlines. The shroud in the second embodiment could be eliminated and the packoff sealed between the inner wall surface of the housing and the exterior of the pump.

The invention claimed is:

1. An apparatus for boosting pressure in a flowline, comprising:
    a bypass valve adapted to be connected into flowline;
    a housing;
    an inlet conduit adapted to connect an interior of the housing to the flowline upstream of the bypass valve;
    an inlet valve in the inlet conduit;
    a pump assembly comprising an electrical motor located entirely within the housing and a centrifugal pump, the pump having an intake within the housing that is in fluid communication with the inlet conduit and a discharge tube adapted to be in fluid communication with the flowline downstream of the bypass valve;
    an outlet valve for selectively isolating the discharge tube from the flowline downstream of the bypass valve, wherein when the bypass valve is closed, the inlet and outlet valves opened and the pump assembly operating, the pump assembly boosts pressure of fluid flowing into the interior of the housing, and when the bypass valve is opened and the inlet and outlet valves closed, fluid may flow through the flowline while the pump assembly is removed for repair or replacement; and
    wherein the housing is cylindrical, has an opening on one end, and further comprises:

a removable end cap on the exterior of and closing the opening of the housing, the opening having a diameter larger than a diameter of the pump and the motor, so that removing the end cap enables the pump assembly to be inserted into and withdrawn from the housing through the opening.

2. The apparatus according to claim 1, further comprising:
an outlet conduit extending from the housing to the flowline downstream of the bypass valve, the outlet valve being located in the outlet conduit;
an isolation member separating discharge pressure of the discharge tube from intake pressure at the intake; and
wherein the pump assembly discharge tube discharges into the interior of the housing.

3. The apparatus according to claim 1, wherein the pump assembly comprises a bolted bowl pump and the apparatus further comprises:
an outlet conduit extending from the housing to the flowline downstream of the bypass valve;
an isolation member separating discharge pressure of the discharge tube from intake pressure at the intake, the isolation member having a packoff that seals around an exterior of the pump at a selected point along the pump; and
wherein the pump assembly discharge tube discharges into the interior of the housing, exposing a portion of the pump downstream of the packoff to discharge pressure, while the remaining portion of the pump is exposed to intake pressure.

4. The apparatus according to claim 1, wherein the pump assembly comprises a bolted bowl pump and the apparatus further comprises:
an outlet conduit extending from the housing to the flowline downstream of the bypass valve, the outlet valve being located in the outlet conduit;
a shroud within the housing, having an upstream end sealed to an upstream end of the housing and a downstream end that is spaced upstream from the outlet conduit, at least a portion of the pump being located within the shroud;
a packoff that seals around an exterior of the pump and to an interior of the shroud at a selected point along the pump; and
wherein the pump assembly discharge tube discharges into the interior of the housing, exposing a portion of the pump downstream of the packoff to discharge pressure, while the remaining portion of the pump is exposed to intake pressure.

5. The apparatus according to claim 1, wherein an annular clearance is located between the electrical motor and the housing, the motor being located upstream of the pump, defining an annular passageway from the inlet conduit past the motor and to the intake of the pump to provide cooling for the motor as fluid flows to the intake of the pump.

6. An apparatus for boosting pressure in a flowline, comprising:
a bypass valve adapted to be connected into flowline;
a housing;
an inlet conduit adapted to connect an interior of the housing to the flowline upstream of the bypass valve;
an inlet valve in the inlet conduit;
a pump assembly comprising an electrical motor located entirely within the housing and a centrifugal pump, the pump having an intake within the housing that is in fluid communication with the inlet conduit and a discharge tube adapted to be in fluid communication with the flowline downstream of the bypass valve;
an outlet valve for selectively isolating the discharge tube from the flowline downstream of the bypass valve, wherein when the bypass valve is closed, the inlet and outlet valves opened and the pump assembly operating, the pump assembly boosts pressure of fluid flowing into the interior of the housing, and when the bypass valve is opened and the inlet and outlet valves closed, fluid may flow through the flowline while the pump assembly is removed for repair or replacement;
an outlet conduit extending from the housing to the flowline downstream of the bypass valve;
wherein the pump assembly discharge tube sealingly stabs within and into engagement with the outlet conduit; and
the outlet valve is located in the outlet conduit.

7. An apparatus for boosting pressure in a main flowline, comprising:
a bypass flowline adapted to be connected into the main flowline;
a bypass valve in the bypass flowline for selectively blocking flow through the bypass flowline;
a housing having an inlet connected to the bypass flowline upstream of the bypass valve, the bypass flowline providing a flowpath for the main flowline when the bypass valve is open that bypasses the housing;
an inlet valve that selectively opens and closes the inlet of the housing;
a centrifugal pump assembly including a motor and a centrifugal pump mounted in the housing, the pump having an intake in fluid communication with the inlet of the housing and a discharge tube in fluid communication with the bypass flowline downstream of the bypass valve, the motor being located upstream from the intake of the pump so that fluid flowing into the housing to the intake flows over the motor;
an outlet valve that selectively opens and blocks communication between the discharge tube and the bypass flowline;
an isolation member separating discharge pressure of the discharge tube from intake pressure at the intake;
the housing having one end containing an opening; and
an end cap removably secured to said one end of the housing over the opening, the opening being larger than a maximum diameter of the pump assembly, the end cap being accessible from an exterior of the housing so that when removed, the pump assembly can be withdrawn from and inserted into the housing through the opening while fluid flows through the bypass flowline.

8. The apparatus according to claim 7, further comprising:
an outlet conduit extending from the housing to the bypass flowline downstream of the bypass valve;
wherein the discharge tube of the pump stabs into the outlet conduit;
a seal located between an exterior portion of the discharge tube and an interior portion of the outlet conduit; and wherein
the isolation member comprises the seal.

9. The apparatus according to claim 7, further comprising:
an outlet conduit extending from the housing to the bypass flowline downstream of the bypass valve; wherein
the isolation member comprises a packoff that seals around an exterior of the pump at a selected point along the pump; and
wherein the discharge tube of the pump discharges into the interior of the housing, exposing a portion of the pump downstream of the packoff to discharge pressure, while the remaining portion of the pump is exposed to intake pressure.

10. An apparatus for boosting pressure, comprising:

a main flowline;

a bypass flowline connected into and inline with the main flowline;

a bypass valve in the bypass flowline for selectively blocking flow from the main flowline through the bypass flowline;

a cylindrical housing having an inlet conduit connected to the bypass flowline upstream of the bypass valve and an outlet conduit connected to the bypass flowline downstream of the bypass valve;

an inlet valve in the inlet conduit that selectively opens and closes the inlet of the housing;

an outlet valve in the outlet conduit that selectively opens and closes the outlet of the housing;

when the bypass valve is open and the inlet and outlet valves closed, the bypass flowline defining a flowpath that is exterior of the housing to allow fluid to flow through the main flowline without flowing through the housing;

a centrifugal pump assembly including a motor and a centrifugal pump mounted in the housing parallel with a longitudinal axis of the housing, the pump and the motor being of smaller diameter than the housing, defining an annular passageway within the housing, the pump having an intake in fluid communication with the passageway and the inlet conduit of the housing and a discharge tube in fluid communication with the outlet conduit of the housing, the motor being located upstream of the pump, causing the pump to draw fluid through the inlet conduit of the housing and through the passageway over the motor to the intake of the pump and to discharge fluid into the outlet conduit of the housing;

an isolation member separating discharge pressure of the discharge tube from intake pressure at the intake of the pump; and a removable end cap on an end of the housing opposite the outlet conduit, the end cap being on an exterior portion of the housing and removable without disturbing the connections of the bypass conduit to the main flowline, the end cap defining an opening in the housing that is larger in diameter than the pump and the motor, so that when the end cap is removed the pump assembly can-be inserted into and withdrawn from the housing while fluid flows through the main flowline and the bypass conduit.

11. The apparatus according to claim 10, further comprising:

wherein the discharge tube of the pump stabs within and into engagement with the outlet conduit of the housing; and the isolation member comprises a seal that seals between an exterior portion of the discharge tube and an interior portion of the outlet conduit of the housing.

12. The apparatus according to claim 10, wherein:

the isolation member comprises a packoff that seals around an exterior of the pump at a selected point along the pump; and the discharge tube of the pump discharges into the interior of the housing, exposing a portion of the pump downstream of the packoff to discharge pressure, while the remaining portion of the pump is exposed to intake pressure.

13. The apparatus according to claim 10, wherein;

the isolation member comprises a shroud having an upstream end in fluid communication with the inlet of the housing, the shroud extending over the motor and having a packoff that seals between the shroud and the pump at a selected point along the pump, defining a first portion of the pump upstream of the packoff that is exposed to intake pressure; and the discharge tube of the pump discharges into the interior of the housing, exposing a second portion of the pump downstream of the packoff to discharge pressure.

14. A method for boosting pressure in a flowline, comprising:

(a) connecting a bypass valve into the flowline;

(b) connecting an inlet of a housing to the flowline upstream of the bypass valve;

(c) providing a centrifugal pump assembly with an electrical motor and a pump, mounting the motor and an intake of a centrifugal pump assembly in the housing in fluid communication with the inlet of the housing, and a discharge tube of the pump assembly in fluid communication with the flowline downstream of the bypass valve;

(d) isolating fluid pressure at the intake from fluid pressure at the discharge tube;

(e) opening the inlet of the housing, closing the bypass valve, and operating the pump assembly, thereby causing fluid from the flowline to flow into the housing where the pump increases the pressure and discharges the fluid back into the flowline, and flowing at least some of the fluid over the motor as the fluid flows to the intake of the pump;

(f) selectively closing the inlet of the housing and an outlet of the housing and opening the bypass valve, and flowing fluid through the flowline exterior of the housing; and (g) removing a closure member from one end of the housing and withdrawing the pump and the motor through the opening.

15. The method according to claim 14, wherein step (d)comprises:

sliding the discharge tube sealingly into an outlet of the housing.

16. The method according to claim 14, wherein step (d) comprises:

installing a packoff around the pump assembly at a point between the intake and the discharge tube; and step (e) comprises:

discharging the fluid from the discharge tube into the interior of the housing to expose an exterior portion of the pump assembly downstream of the packoff to discharge pressure.

* * * * *

UNITED STATES PATENT AND TRADEMARK OFFICE
CERTIFICATE OF CORRECTION

| | | |
|---|---|---|
| PATENT NO. | : 7,059,345 B2 | Page 1 of 1 |
| APPLICATION NO. | : 10/308580 | |
| DATED | : June 13, 2006 | |
| INVENTOR(S) | : Christopher K. Shaw | |

It is certified that error appears in the above-identified patent and that said Letters Patent is hereby corrected as shown below:

Title Page,

<u>In the Abstract:</u>

(57) line 7, delete "in" and insert --and-- before "an outlet"
     line 7, delete "in" after "downstream" and insert --of--

Column 1, line 22, delete "1" before "It has been"

Column 7, line 48, delete "can-be" and insert --can be--

Signed and Sealed this

Twenty-eighth Day of November, 2006

JON W. DUDAS
*Director of the United States Patent and Trademark Office*